US011585983B2

(12) United States Patent
Lichoulas et al.

(10) Patent No.: US 11,585,983 B2
(45) Date of Patent: Feb. 21, 2023

(54) OPTICAL FIBER MASS SPLICE METHODS AND ASSEMBLIES

(71) Applicant: AFL Telecommunications LLC, Duncan, SC (US)

(72) Inventors: Ted Lichoulas, Simpsonville, SC (US); Chris Donaldson, Greenville, SC (US); Bobby Branks, Fletcher, NC (US)

(73) Assignee: AFL TELECOMMUNICATIONS LLC, Duncan, SC (US)

( * ) Notice: Subject to any disclaimer, the term of this patent is extended or adjusted under 35 U.S.C. 154(b) by 94 days.

(21) Appl. No.: 17/265,748

(22) PCT Filed: Aug. 16, 2019

(86) PCT No.: PCT/US2019/046729
§ 371 (c)(1),
(2) Date: Feb. 3, 2021

(87) PCT Pub. No.: WO2020/041101
PCT Pub. Date: Feb. 27, 2020

(65) Prior Publication Data
US 2021/0302655 A1   Sep. 30, 2021

Related U.S. Application Data

(60) Provisional application No. 62/721,896, filed on Aug. 23, 2018.

(51) Int. Cl.
*G02B 6/255* (2006.01)
*G02B 6/25* (2006.01)
*G02B 6/36* (2006.01)

(52) U.S. Cl.
CPC .............. *G02B 6/2555* (2013.01); *G02B 6/25* (2013.01); *G02B 6/2553* (2013.01); *G02B 6/3616* (2013.01)

(58) Field of Classification Search
CPC .. G02B 6/2551; G02B 6/2553; G02B 6/2555; G02B 6/2556
See application file for complete search history.

(56) References Cited

U.S. PATENT DOCUMENTS 4,118,618 A * 10/1978 Gauthier .............. H05H 1/3405
219/121.45
4,345,137 A * 8/1982 Mignien .............. G02B 6/3805
219/121.45

(Continued)

FOREIGN PATENT DOCUMENTS

EP        0216307 A2 *  4/1987
JP        S61205904 A    9/1986

(Continued)

OTHER PUBLICATIONS

International Patent Application No. PCT/US2019/046729; International Search Report; dated Nov. 18, 2019; (3 pages).

*Primary Examiner* — Michael Stahl
(74) *Attorney, Agent, or Firm* — Dority & Manning, P.A.

(57) ABSTRACT

Optical fiber mass splice methods and assemblies are provided. A method may include securing a fiber clamp to a fiber setting fixture, the fiber setting fixture including a fiber alignment block and a backstop. A plurality of fiber grooves may be defined in the fiber alignment block. The method may further include inserting a plurality of optical fibers into the fiber setting fixture such that each of the plurality of optical fibers is disposed in one of the plurality of fiber grooves and contacts the backstop. The method may further include loading, after the inserting step, each of the plurality of optical fibers into the fiber clamp. The method may further include clamping the plurality of optical fibers in the fiber clamp.

17 Claims, 11 Drawing Sheets

(56) References Cited

U.S. PATENT DOCUMENTS

| | | | | |
|---|---|---|---|---|
| 4,807,960 A | * | 2/1989 | Oppenlander | G02B 6/2551 |
| | | | | 385/59 |
| 5,813,902 A | | 9/1998 | Wiegand | |
| 2003/0123836 A1 | * | 7/2003 | Fujisawa | G02B 6/3636 |
| | | | | 385/137 |
| 2014/0003785 A1 | * | 1/2014 | Sato | G02B 6/4439 |
| | | | | 385/137 |

FOREIGN PATENT DOCUMENTS

| | | | |
|---|---|---|---|
| JP | 62-254108 A | * | 11/1987 |
| JP | S63151905 A | | 6/1988 |
| JP | H07218753 A | | 8/1995 |

* cited by examiner

OPTICAL FIBER MASS SPLICE METHODS AND ASSEMBLIES

This application is a National Stage Patent Application of PCT/US2019/046729, filed on Aug. 16, 2019, which claims the benefit of priority to U.S. Provisional Patent Application No. 62/721,896, filed on Aug. 23, 2018, the disclosures of all of which are incorporated by reference herein in their entireties.

FIELD

The present disclosure relates generally to improved methods and assemblies which facilitate mass splicing of optical fibers.

BACKGROUND

Spliced fiber optic assemblies having spliced on connectors are widely utilized in a variety of fiber optic applications. There are generally two categories of spliced-on connector solutions on the market: single fiber connector to single fiber splice-on connectors using individual fiber splices; and multi-fiber connector to multifiber splice-on connectors using a mass fusion splice.

However, various new fiber optic applications require new splice-on connector solutions. For example, emerging applications such as in the medical and harsh environment market spaces requiring that individual connectors or termini are spliced onto multi-fiber groups, such as groups of loose tube fibers or fiber optic ribbons. For example, in many cases, it is preferable to splice individual connectors or termini to a multi-fiber ribbon or cable and protect this splice point with a mass fusion splice protector.

Application drivers include:

(1) Medical market—In catheters, a precision cleave, ball lens, endcap, or sensor is attached to one end of a fiber. This fiber is fixed to a probe end at one end of the catheter. The opposite end of this fiber is threaded back through the catheter. This fiber must then be terminated so the catheter can interface with medical instrumentation. Medical companies are being forced to develop internal connectorization capabilities or individual fiber splicing capabilities that increase manufacturing complexity and cost.

(2) Harsh environment connector market—It is common to use multiple individual termini in connector housings to create a multi-pin multi-fiber connector housing. Significant manufacturing skill is required to make these connectors by directly terminating fibers, resulting in increased cost and complexity.

Accordingly, improved methods and apparatus for mass splice applications are desired in the art. In particular, mass splice methods and assemblies which facilitate mass splicing and which address various of the above-stated issues, such as by reducing cost and/or complexity, would be advantageous.

BRIEF DESCRIPTION

Aspects and advantages of the invention will be set forth in part in the following description, or may be obvious from the description, or may be learned through practice of the invention.

In accordance with some embodiments, an optical fiber mass splice method is provided. The method may include securing a fiber clamp to a fiber setting fixture, the fiber setting fixture including a fiber alignment block and a backstop. A plurality of fiber grooves may be defined in the fiber alignment block. The method may further include inserting a plurality of optical fibers into the fiber setting fixture such that each of the plurality of optical fibers is disposed in one of the plurality of fiber grooves and contacts the backstop. The method may further include loading, after the inserting step, each of the plurality of optical fibers into the fiber clamp. The method may further include clamping the plurality of optical fibers in the fiber clamp.

In accordance with other embodiments, an optical fiber mass splice assembly is provided.

The optical fiber mass splice assembly may include a fiber setting fixture. The fiber setting fixture may include a fiber alignment block, wherein a plurality of fiber grooves are defined in the fiber alignment block. The fiber setting fixture may further include a backstop. The fiber setting fixture may further include a fiber clamp mount movable relative to the fiber alignment block along at least one axis. The fiber setting fixture may further include a cover removably enclosing at least a portion of the plurality of fiber grooves.

The optical fiber mass splice assembly may include a fiber clamp. The fiber clamp may be removably securable to the fiber clamp mount. The fiber clamp may include a clamp body and at least one groove defined in the clamp body.

The fiber clamp may further include a connector holder. The connector holder may include an arm extending from the clamp body and a plurality of connector clips mounted to the arm.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
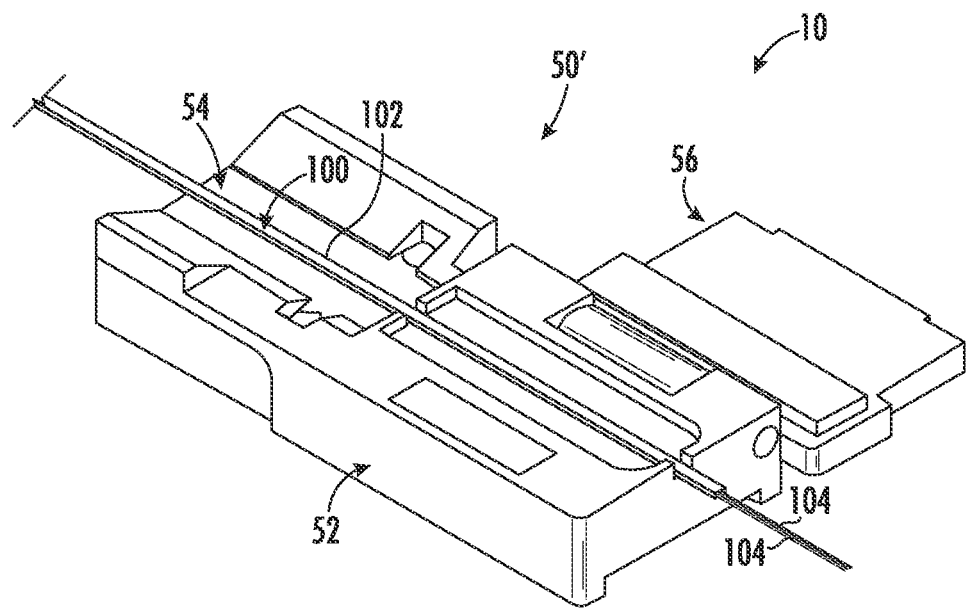
FIG. 1 is a perspective view of a fiber clamp with a fiber optic ribbon loaded therein in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 13, embodiments of optical fiber mass splice assemblies 10 and components thereof are provided. Such assemblies 10 may, in some embodiments, be utilized in optical fiber mass splice methods in accordance with the present disclosure. Assemblies 10 and methods in accordance with the present disclosure advantageously provide improve mass splicing of optical fibers which may be particularly useful in fields such as, for example, the medical field and harsh environment field. In particular, assemblies 10 and methods in accordance with the present disclosure advantageously reduce the time, cost, and complexity associate with mass splicing efforts.

Referring now to FIGS. 1 through 5, various embodiments of fiber clamps 50 are illustrated. One or more fiber clamps 50, such as in exemplary embodiments first and second fiber clamps 50', 50", may be components of an optical fiber mass splice assembly 10 in accordance with the present disclosure.

Figure 2:
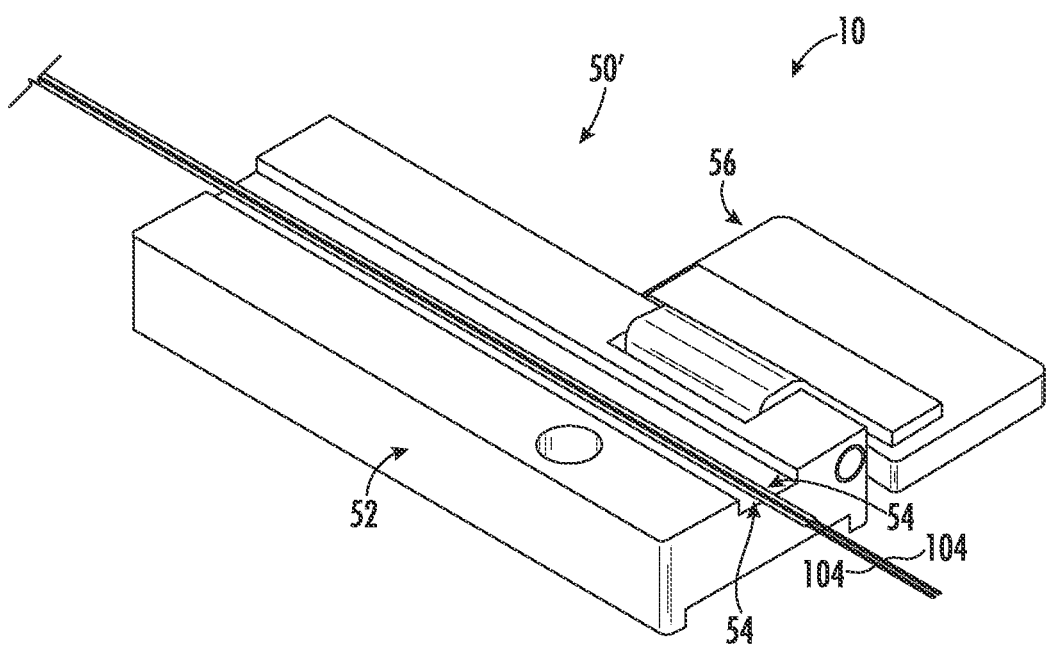
FIG. 2 is a perspective view of a fiber clamp with a plurality of loose optical fibers loaded therein in accordance with embodiments of the present disclosure.
Figure 3:
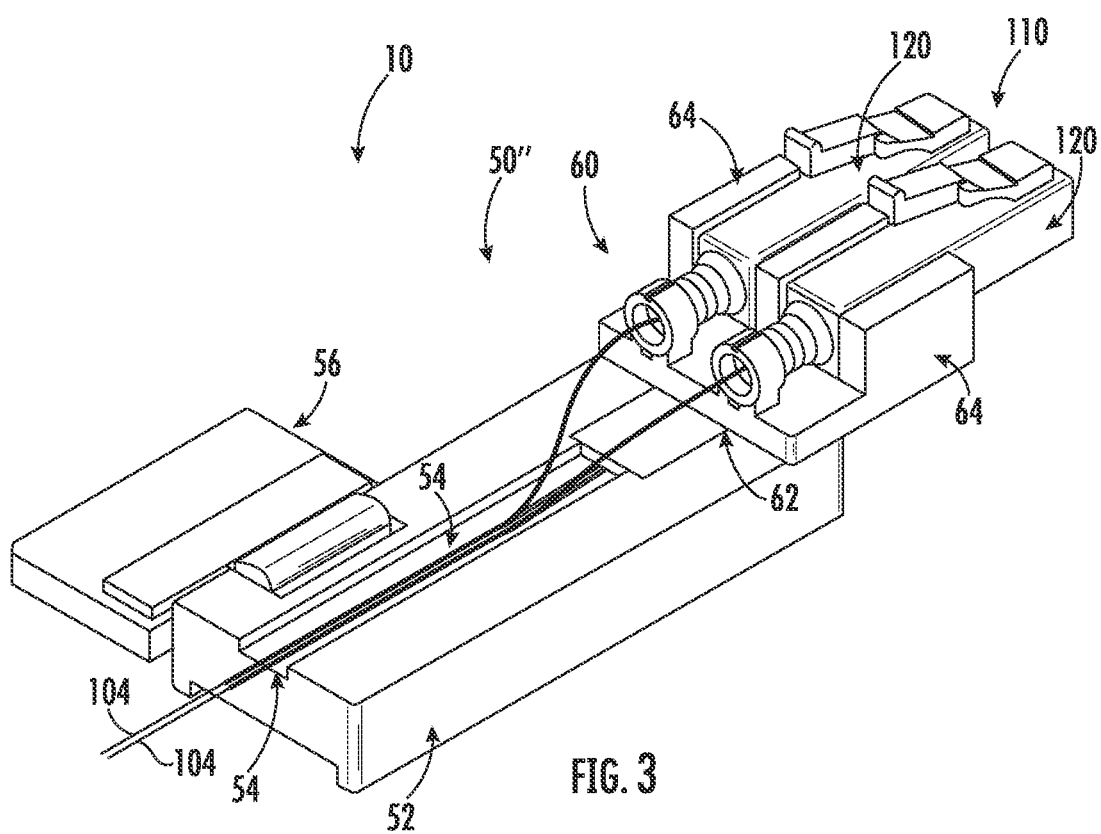
FIG. 3 is a perspective view of a fiber clamp which includes a connector holder and has a plurality of loose optical fibers loaded therein in accordance with embodiments of the present disclosure.
Figure 4:
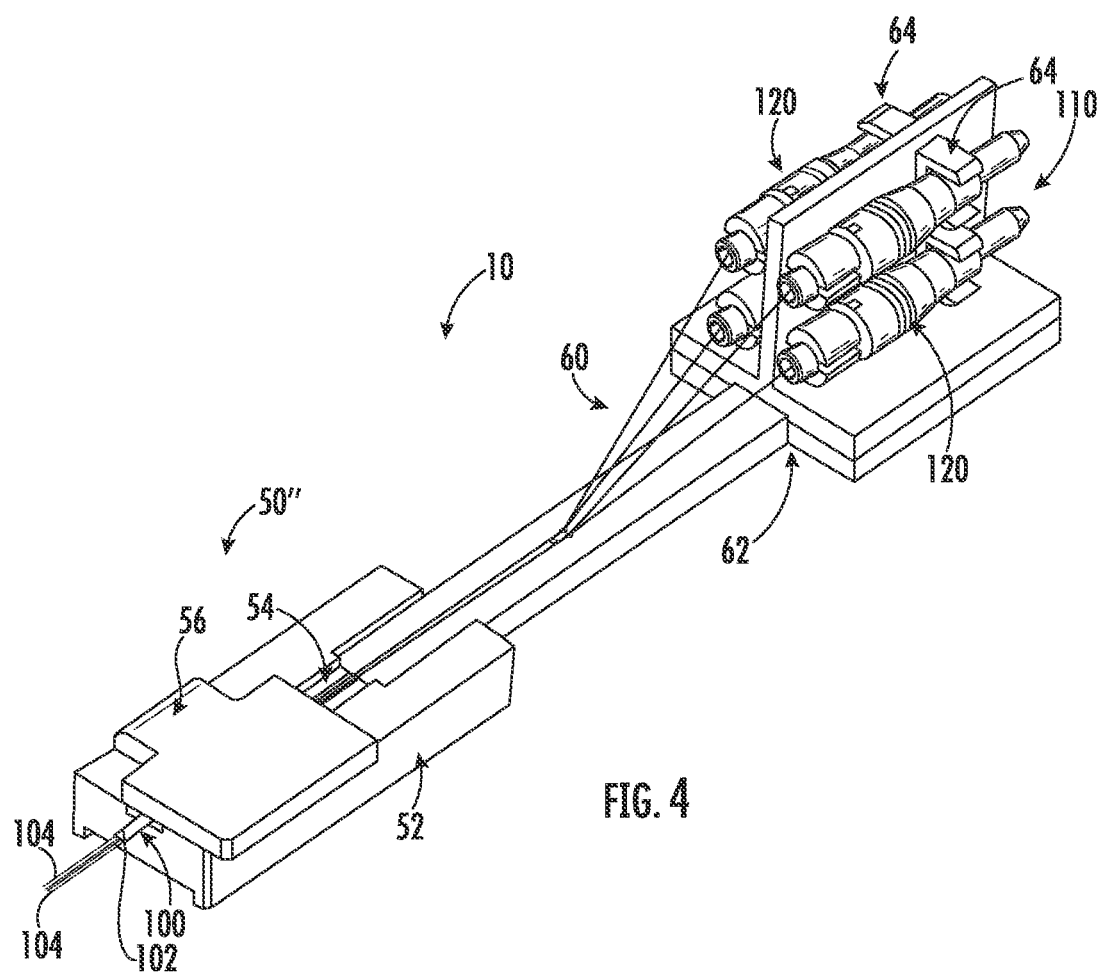
FIG. 4 is a perspective view of a fiber clamp which includes a connector holder and has a fiber optic ribbon loaded therein in accordance with embodiments of the present disclosure.
Figure 5:
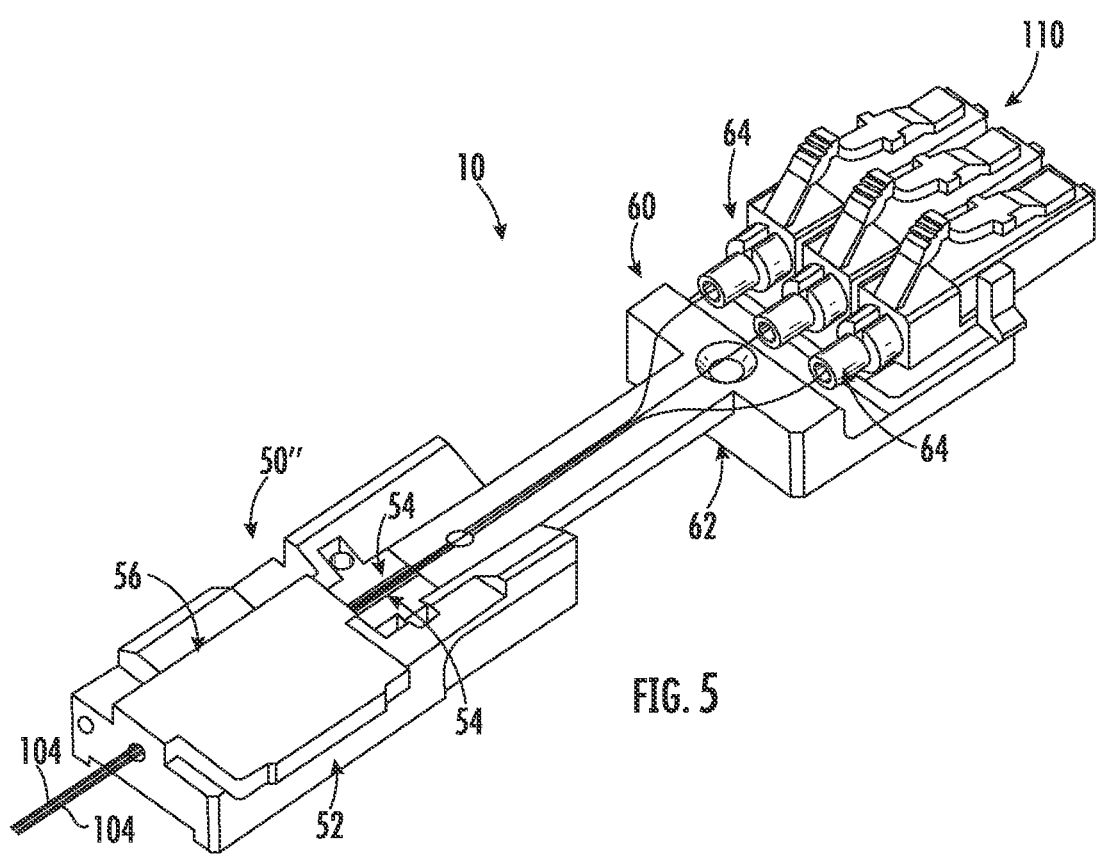
FIG. 5 is a perspective view of a fiber clamp which includes a connector holder and has a plurality of loose optical fibers loaded therein in accordance with other embodiments of the present disclosure.

A fiber clamp 50 may include a clamp body 52 in which one or more grooves 54 are defined. In some embodiments, as illustrated in FIGS. 1 and 4, a single groove 54 may be defined which can accommodate an optical fiber ribbon 100. The optical fiber ribbon may be a standard optical fiber ribbon 100 having an outer jacket 102 which surrounds a plurality of optical fibers 104, or may be an intermittently bonded optical fiber ribbon having a plurality of loose optical fibers 104 with intermittent bonds between various adjacent optical fibers 104 throughout the lengths thereof. In other embodiments, as illustrated in FIGS. 2, 3, and 5, a plurality of grooves 54, which may be aligned in parallel, may be defined. Each groove 54 may accommodate a single loose optical fiber 104. In these embodiments, such clamps 50 may thus accommodate a plurality of loose optical fibers 104.

A fiber clamp 50 may further include a cover 56 which may be movably connected to the clamp body 52. For example, in exemplary embodiments as illustrated in FIGS. 1 through 5, the cover 56 may be rotatably connected to the clamp body 52. The cover 56 may be movable between an open position, as shown in FIGS. 1 through 3, which allows loading and/or unloading of ribbons 100 or loose optical fibers 104 into the grooves 54, and a closed position, as shown in FIGS. 4 and 5, which clamps the ribbons 100 or loose optical fibers 104 within the fiber clamp 50.

In some embodiments, a fiber clamp 50 is configured to accommodate a free plurality of optical fibers (whether in ribbon form or loose) which may, for example, be spliced to an optical fiber pigtail 110. Embodiments of such first fiber clamps 50' are illustrated in FIGS. 1 and 2. In other embodiments, a fiber clamp 50 is configured to accommodate an optical fiber pigtail 110. Embodiments of such second fiber clamps 50" are illustrated in FIGS. 3 through 5.

In some embodiments, a fiber clamp 50, such as a second fiber clamp 50", may include additional components to support connectors 120 of the pigtails 110 being clamped in the fiber clamps 50. For example, the fiber clamp 50 may include a connector holder 60 which is connected to the clamp body 52. Connector holder 60 may, for example, include an arm 62 and a plurality of connector clips 64. The arm 62 may be connected to the clamp body 52, and may extend from the clamp body 52. In exemplary embodiments, the arm 62 may be cantilevered from the clamp body 52. The connector clips 64 may be mounted to the arm 62, such as in exemplary embodiments removably mounted to the arm 62. In exemplary embodiments wherein the arm 62 is cantilevered from the clamp body 52, the connector clips 64 may be mounted at a free end of the arm 62 opposite a connected end of the arm 62. Each connector clip 64 may hold a connector 120 which is inserted therein and which is connected to an optical fiber 104, such as an optical fiber 104 loaded and/or clamped into the second fiber clamp 50".

Referring now to FIGS. 6 through 10, optical fiber mass splice assemblies 10 may include a fiber setting fixture 20. The fiber setting fixture 20 may advantageously facilitate improved loading of optical fiber ribbons 100 and/or loose optical fibers 104 into fiber clamps 50. An orthogonal coordinate system may be defined for the fiber setting fixture 20. The coordinate system may include, for example, a longitudinal axis 22, a lateral axis 24, and a transverse axis 26, each of which may be mutually orthogonal to the other axes.

A fixture 20 may, for example, include a fiber alignment block 30. A plurality of fiber grooves 32, which may for example be aligned in parallel, may be defined in the fiber alignment block 30. Each fiber groove 32 may accommodate a portion of an optical fiber 104, such as a portion of an optical fiber 104 from a ribbon 100 (which has, for example, been stripped, cleaved, etc. as necessary) or a portion of a loose optical fiber 100 (which has, for example, been stripped, cleaved, etc. as necessary). The optical fibers 104 may be inserted into the fiber setting fixture 30, such as into the fiber grooves 32 of the fiber alignment block 30, to facilitate proper alignment of the optical fibers 104 and simple, efficient loading of the optical fibers 104 into fiber clamps 50, such as for splicing purposes.

In exemplary embodiments, the fiber grooves 32 may be oriented and extend (such as lengthwise) at an angle 34 to a plane defined by the longitudinal axis 22 and the lateral axis 24. The angle 34 may, for example, be in the range between 15 degrees and 75 degrees, such as between 25 degrees and 65 degrees, such as between 35 degrees and 55 degrees, such as between 40 degrees and 50 degrees. The angle of the fiber grooves 32 may advantageously facilitate proper loading of the optical fibers 104 therein.

Fiber setting fixture 20 may further include a backstop 36 which may, for example, be disposed proximate the block 30 and fiber grooves 32. For example, backstop 36 may be positioned at a distal end of the fiber grooves 32. When an optical fiber 104 is inserted into a fiber groove 32, the optical fiber 104 may traverse through the length of the fiber groove 32 until the optical fiber 104 reaches the distal end of the fiber groove 32 and encounters the backstop 36. At this point, the optical fiber 104 may abut against the backstop 36, such that further lengthwise traversal of the optical fiber 104 is prevented. Accordingly, each optical fiber 104 of a plurality of optical fibers 104 inserted into the fiber grooves 32 is inserted to a uniform length/distance, thus ensuring precise and accurate alignment and loading into a clamp 50, such as for splicing purposes.

The fiber setting fixture 20 may further include a fiber clamp mount 38. Each fiber clamp 50, which may for example be a component of an assembly 10, may be removably securable to the fiber clamp mount 38 to facilitate loading of optical fibers 104 therein. The fiber clamp mount 38 may further be movable relative to the fiber alignment block 30, such as along at least one axis. Such movement may facilitate alignment of the one or more grooves 54 with the plurality of fiber grooves 32. Accordingly, after such alignment, optical fibers 104 may, for example, be first inserted into the fiber grooves 32 and then loaded into the one or more grooves 54. Accordingly, efficient, precise, and accurate loading into a clamp 50 is facilitated.

In exemplary embodiments, mount 38 may be movable along the lateral axis 24. Additionally or alternatively, mount 38 may be movable along the longitudinal axis 22 and/or the transverse axis 24.

The fiber setting fixture 20 may further include a cover 40. Cover 40 may removably enclose at least a portion of the plurality of fiber grooves 32, such that optical fibers 104 being inserted into the fiber grooves 32 are inserted between the cover 40 and the block 30. Cover 40 may, for example, be removably connectable to the block 30 or movably connected to the block 30. When the optical fibers 104 are being inserted into the fiber grooves 32, the cover 40 may be disposed on the fiber alignment block 30 such that the fiber grooves 32 are at least partially enclosed. After the optical fibers 104 are secured in a clamp 50, the cover 40 may then be removable from the fiber grooves 32, such as via removal from the fiber alignment block 30 or movement from a closed position to an open position, to allow simple and efficient removal of the optical fibers 104 from the fiber grooves 32.

In exemplary embodiments, the cover 40 may be a magnet. Alternatively, the cover 40 may be a hinged block or other suitable apparatus for selectively enclosing at least portions of the fiber grooves 32.

Figure 6:
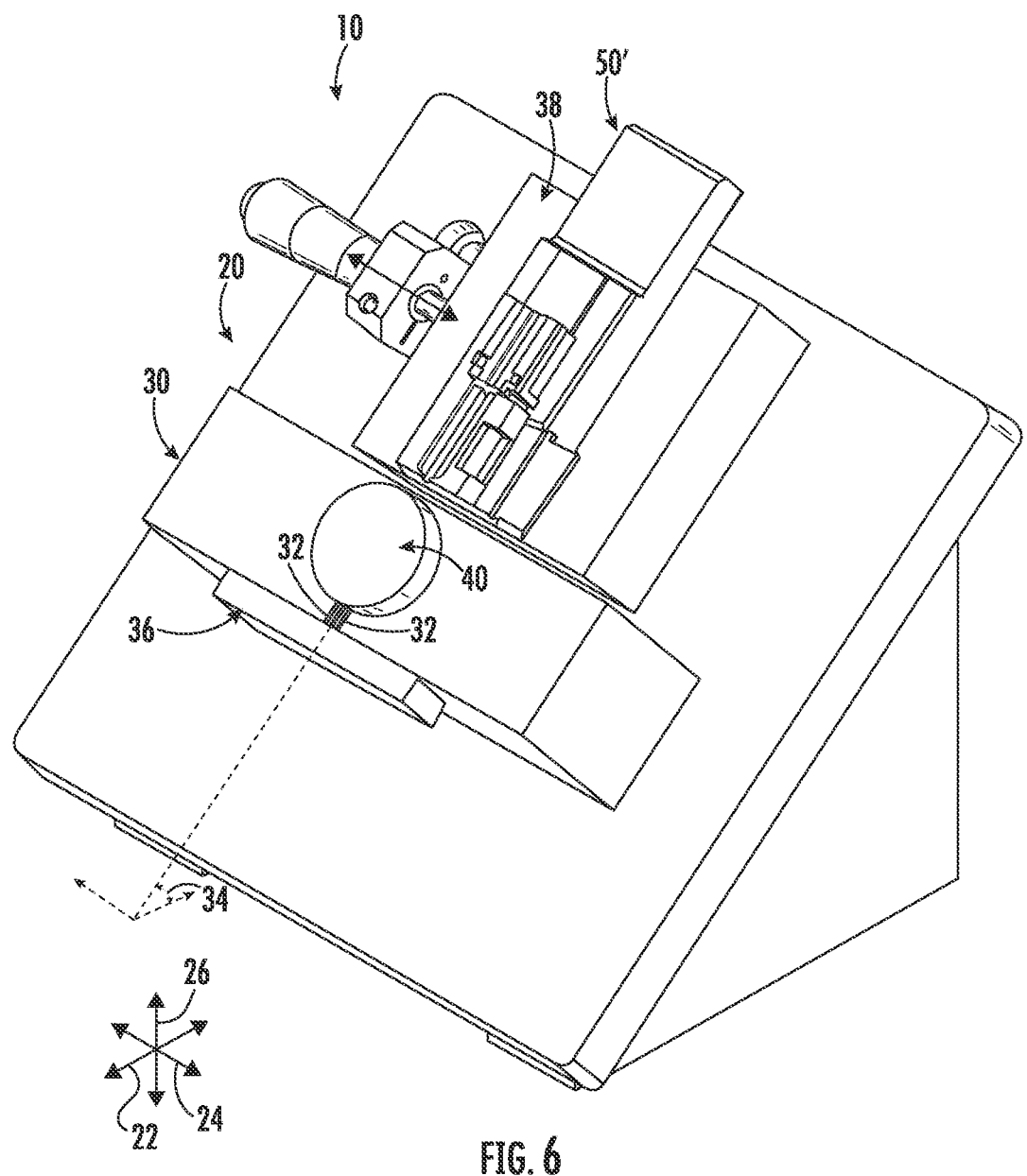
FIG. 6 is a perspective view of a fiber setting fixture with a fiber clamp secured thereon in accordance with embodiments of the present disclosure.
Figure 7:
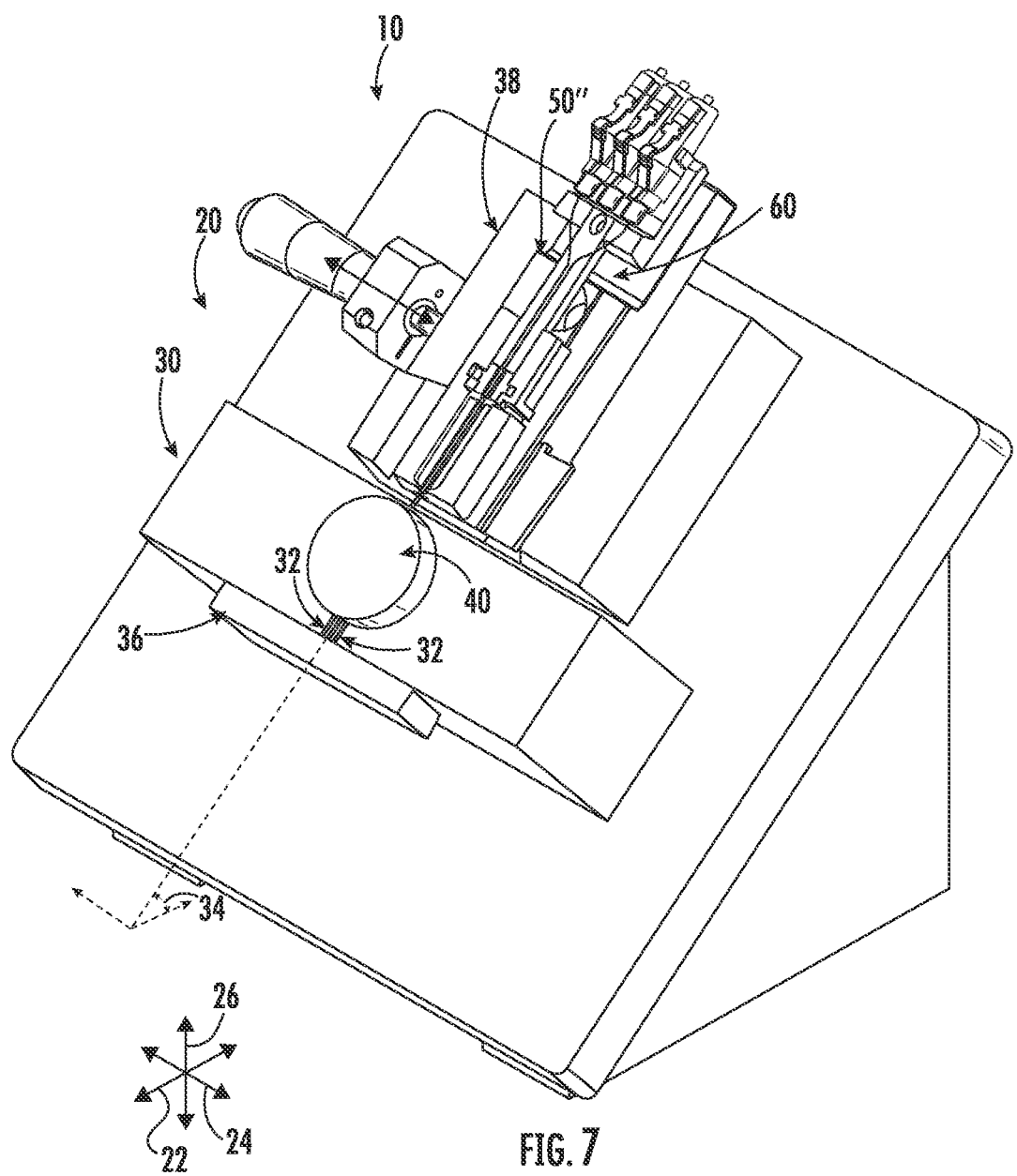
FIG. 7 is a perspective view of a fiber setting fixture with a fiber clamp secured thereon in accordance with other embodiments of the present disclosure.
Figure 8:
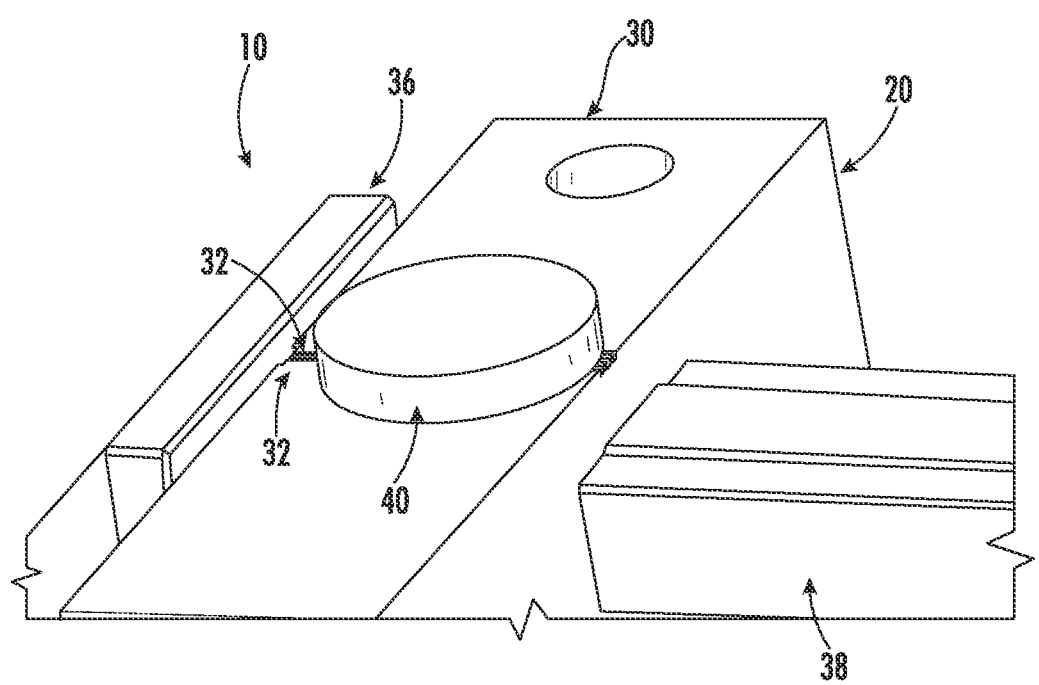
FIG. 8 is a perspective view of a portion of a fiber setting fixture, without a fiber clamp secured thereon, in accordance with embodiments of the present disclosure.
Figure 9:
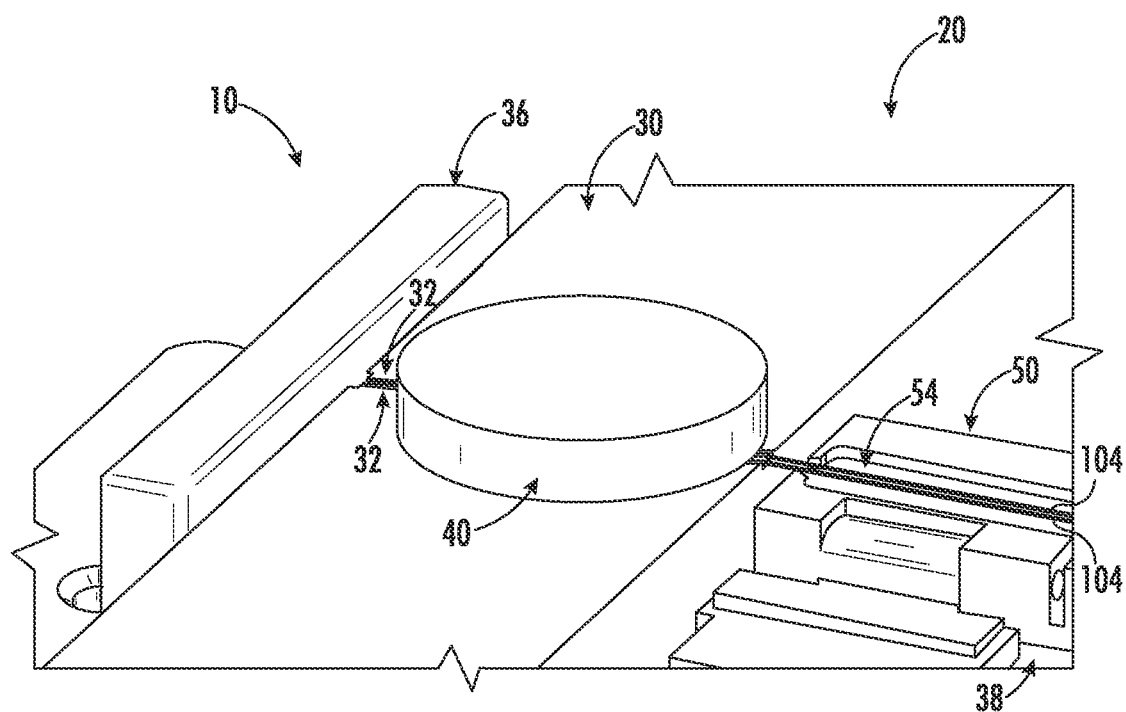
FIG. 9 is a perspective view of a portion of a fiber setting fixture, with a fiber clamp secured thereon and optical fibers inserted into the fiber setting fixture and loaded into the fiber clamp, in accordance with embodiments of the present disclosure.
Figure 10:
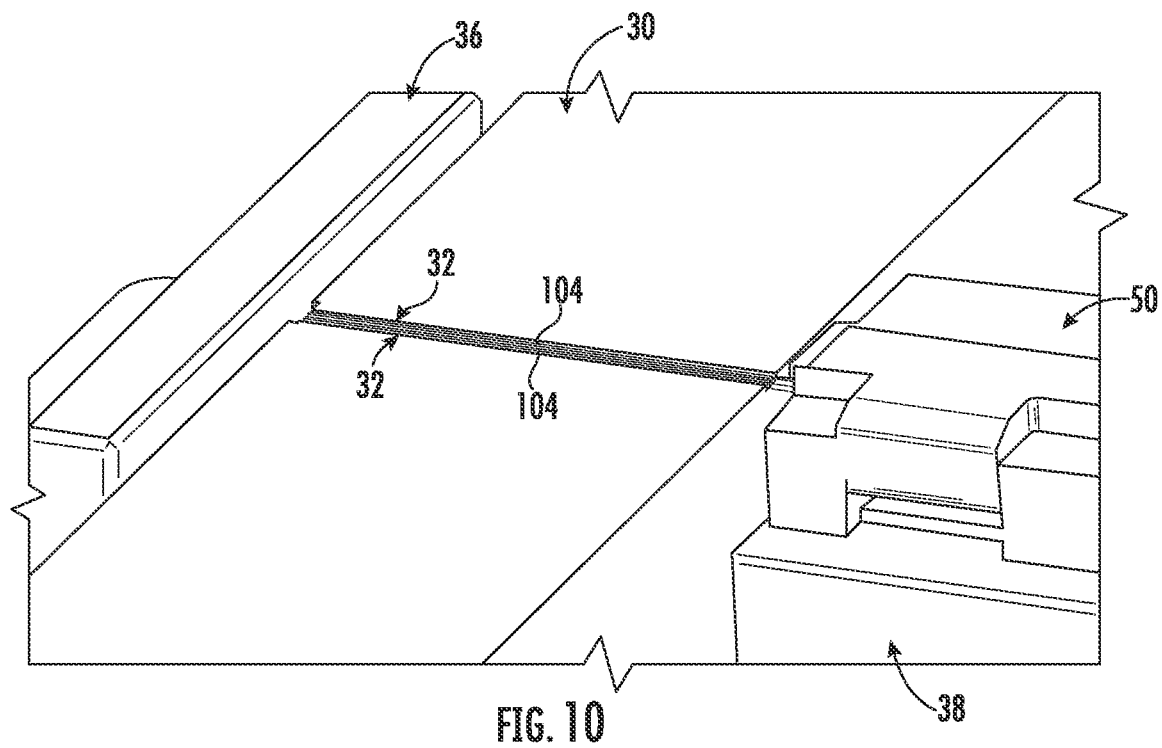
FIG. 10 is a perspective view of a portion of a fiber setting fixture, with a cover removed, in accordance with embodiments of the present disclosure.

As discussed, and referring again to FIGS. 1 through 13, the present disclosure is further directed to optical fiber mass splice methods. A method 200 in accordance with the present disclosure may, for example, include the step 210 of securing a fiber clamp 50, such as a first fiber clamp 50' as illustrated in FIG. 6 or a second fiber clamp 50" as illustrated in FIG. 7, to a fiber setting fixture 20. For example, the fiber clamp 50 may be secured to a fiber clamp mount 38. FIG. 8 illustrates a fixture 20 prior to, for example, securing of a fiber clamp 50 to a mount 38 of the fixture 20. FIGS. 9 and 10 illustrate a fiber clamp 50 mounted to a mount 38 of the fixture 20.

A method 200 may further include the step 215 of aligning the one or more grooves 54 of the fiber clamp 50 with the plurality of fiber grooves 32 of the fiber setting fixture 20. Such alignment is illustrated, for example, by arrows in FIGS. 6 and 7.

A method 200 may further include the step 220 of inserting a plurality of optical fibers 104 (whether in loose form or ribbon form, as discussed herein) into the fiber setting fixture 20 such that each of the plurality of optical fibers 104 is disposed in one of the plurality of fiber grooves 32 and contacts the backstop 36. Such insertion is illustrated, for example, in FIG. 9. For example, the plurality of fiber grooves 32 may each extend along a lengthwise direction (and may advantageously be parallel), and the plurality of optical fibers 104 may be inserted along the lengthwise direction until each of the plurality of optical fibers 104 contacts the backstop 36.

A method 200 may further include the step 225 of loading each of the plurality of optical fibers 104 into the fiber clamp 50. Such loading step 225 may, in exemplary embodiments, occur after the inserting step 220. The clamp 50 may, for example, be in an open position for such loading. Loading may include, for example, inserting the optical fibers 104 (such as of a ribbon 100, or loose optical fibers 104) into the one or more grooves 54. FIG. 9 illustrates optical fibers 104 loaded into an open fiber clamp 50.

A method 200 may further include the step 230 of clamping the plurality of optical fibers 104 into the fiber clamp 50. Such clamping step 230 may, in exemplary embodiments, occur after the loading step 225. Such clamping may include moving the clamp 50 from an open position to a closed position. When clamped, the optical fibers 104 may be secured in position in the grooves 54. FIG. 10 illustrates optical fibers 104 clamped into a fiber clamp 50.

A method 200 may further include the step 235 of removing the cover 40 from the plurality of fiber grooves 32. Such removing step 235 may, for example, occur after the clamping step 230. FIG. 10 illustrates an assembly 10 with the cover 40 removed from the fiber grooves 32.

After the plurality of optical fibers 104 are secured in a clamp 50, the clamp 50 may be removed from the fixture 20 for splicing and/or other processing. For example, a method 200 may include the step 240 of removing the loaded and clamped fiber clamp 50 from the fiber clamp mount 28.

After the removal step 240, various steps as discussed herein may be repeated using another plurality of optical fibers 104 and another clamp 50. For example, one or more of steps 210 through 240 may be repeated. In some embodiments, such steps may be performed for a first plurality of optical fibers 104' and with a first fiber clamp 50', and such steps may also be performed for a second plurality of optical fibers 104" and with a second fiber clamp 50". The first plurality of optical fibers 104' may be a free plurality of optical fibers, and the second plurality of optical fibers 104" may be an optical fiber pigtail 110.

Figure 11:
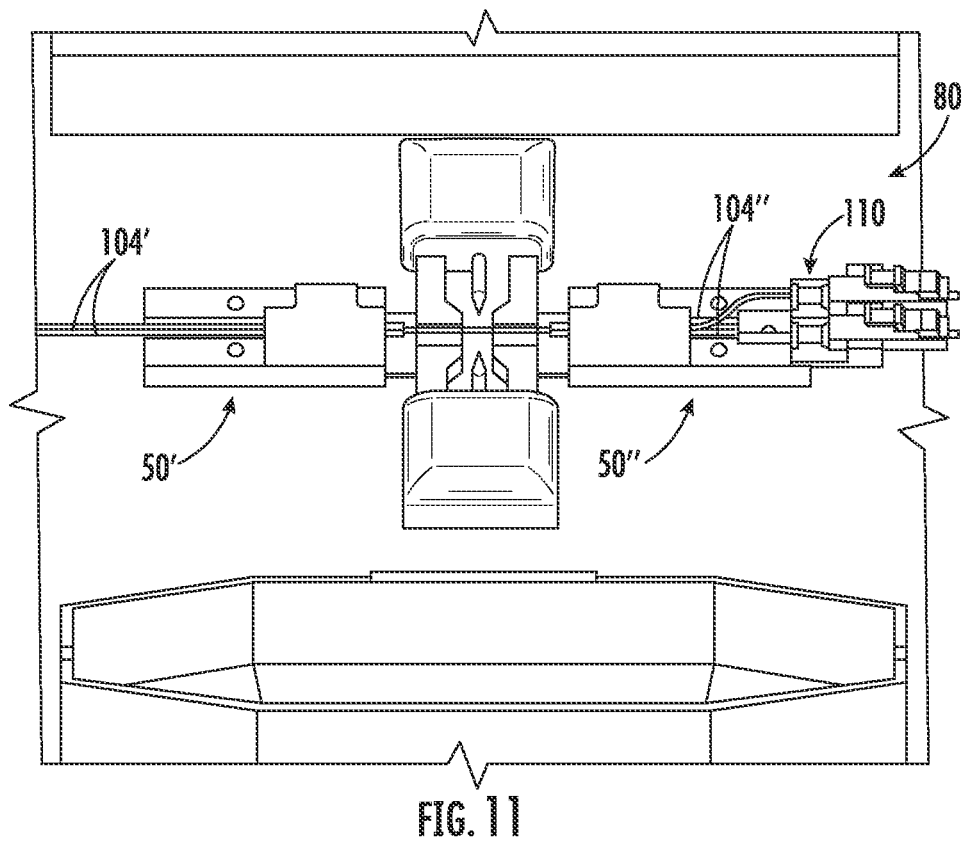
FIG. 11 is a top view of a splicer with loaded fiber clamps positioned thereon in accordance with embodiments of the present disclosure.

In some embodiments, method 200 may further include the step 250 of transporting a loaded and clamped fiber clamp 50 from the fiber setting fixture 20 to a splicer 80. Such step may, for example, occur for a loaded and clamped first fiber clamp 50' and for a loaded and clamped second fiber clamp 50". A transported, loaded, and clamped first and second fiber clamp 50', 50" in a splicer 80 is shown in FIG. 11.

Figure 12:
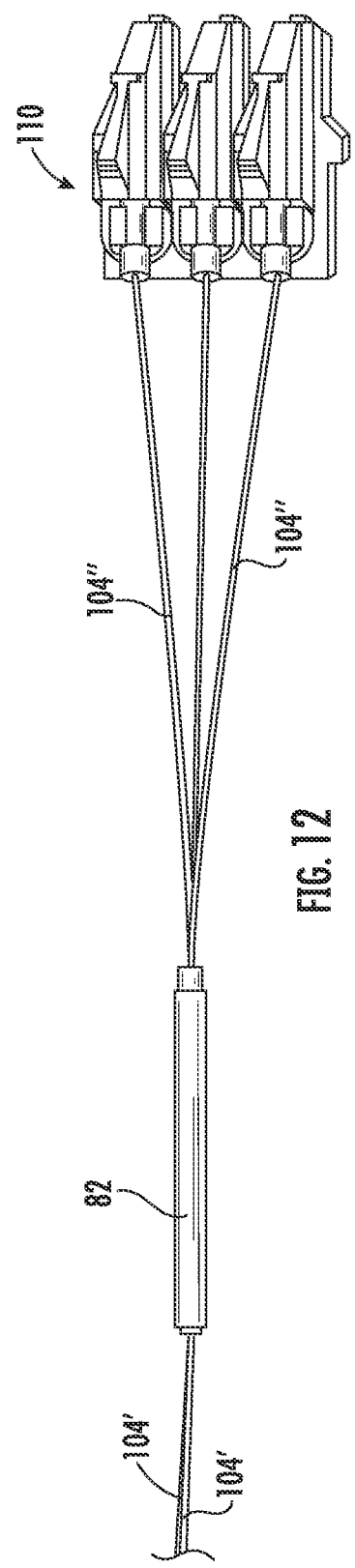
FIG. 12 is a spliced fiber optic assembly in accordance with embodiments of the present disclosure.
Figure 13:
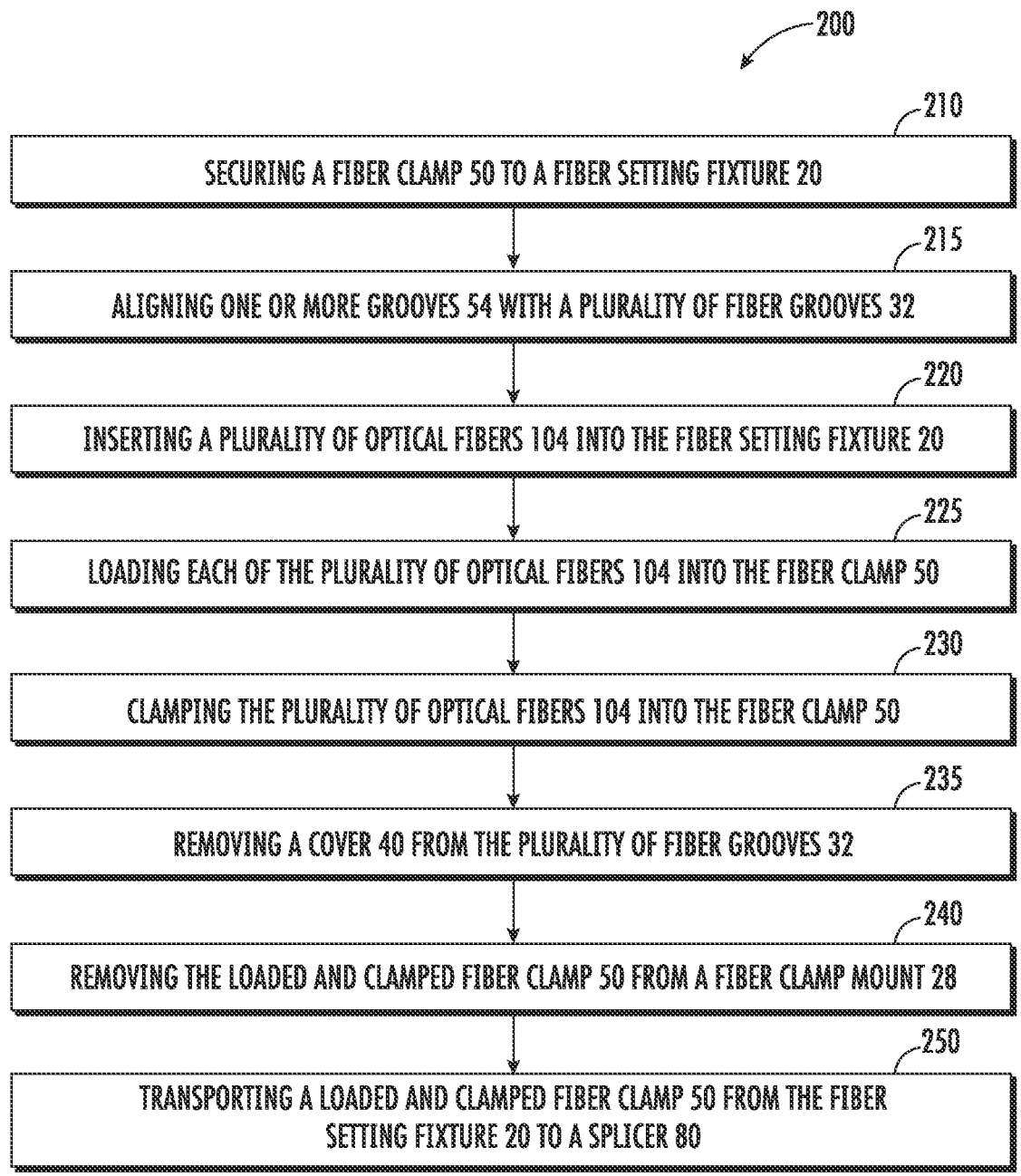
FIG. 13 is a flow chart illustrating a method in accordance with embodiments of the present disclosure.

Once transported, the optical fibers 104 clamped in the fiber clamps 50 may, for example, be spliced together and/or otherwise processed. For example, in some embodiments, first optical fibers 104' and second optical fibers 104" may be spliced together in the splicer 80. Further, after splicing, a splice protector sleeve 82 (which may, for example, be preloaded on the first optical fibers 104' or second optical fibers 104") may be provided on the splice which results from splicing of the first optical fibers 104' and second optical fibers 104" together. The splice protector sleeve 82 for example be formed from a heat shrink material. The splice protector sleeve 82 may be heated onto the spliced together first optical fiber 104' and second optical fiber 104" to protect the splice. FIG. 12 illustrates a spliced fiber optic assembly which includes spliced together first optical fibers 104' and second optical fibers 104" and further includes a splice protector sleeve 82 heated thereon.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A optical fiber mass splice method, comprising:
   securing a fiber clamp to a fiber setting fixture, the fiber setting fixture comprising a fiber alignment block and a backstop, wherein a plurality of fiber grooves are defined in the fiber alignment block;
   inserting a plurality of optical fibers into the fiber setting fixture such that each of the plurality of optical fibers is disposed in one of the plurality of fiber grooves and contacts the backstop;
   loading, after the inserting step, each of the plurality of optical fibers into the fiber clamp;
   clamping the plurality of optical fibers in the fiber clamp; and
   transporting the loaded and clamped fiber clamp from the fiber setting fixture to a splicer.

2. The method of claim 1, wherein the fiber clamp comprises at least one groove, and further comprising aligning the at least one groove of the fiber clamp with the plurality of fiber grooves of the alignment block.

3. The method of claim 2, wherein the fiber clamp is secured to a fiber clamp mount, and wherein the fiber clamp mount is movable relative to the fiber alignment block along at least one axis.

4. The method of claim 1, wherein the plurality of fiber grooves of the fiber setting fixture each extend along a lengthwise direction, and wherein the plurality of optical fibers are inserted along the lengthwise direction until each of the plurality of optical fibers contacts the backstop.

5. The method of claim 1, wherein the fiber setting fixture further comprises a cover, the cover disposed on the fiber alignment block and at least partially enclosing the plurality of fiber grooves during the inserting step, and further comprising removing, after the clamping step, the cover from the plurality of fiber grooves.

6. The method of claim 5, wherein the cover is a magnet.

7. The method of claim 1, wherein a longitudinal axis, lateral axis, and transverse axis are defined by the fiber setting fixture, and wherein the plurality of fiber grooves extend at an angle to a plane defined by the longitudinal axis and lateral axis.

8. The method of claim 1, wherein the fiber clamp comprises a clamp body and a connector holder, the connector holder comprising an arm extending from the clamp body and a plurality of connector clips mounted to the arm.

9. The method of claim 8, wherein the plurality of connector clips are removably mounted to the arm.

10. The method of claim 8, wherein the arm is cantilevered from the clamp body and the plurality of connector clips are mounted at a free end of the arm.

11. The method of claim 1, wherein the plurality of optical fibers are loose optical fibers.

12. The method of claim 1, wherein the plurality of optical fibers form a ribbon.

13. An optical fiber mass splice assembly, comprising:
    a fiber setting fixture, the fiber setting fixture comprising:
       a fiber alignment block, wherein a plurality of fiber grooves are defined in the fiber alignment block;
       a backstop;
       a fiber clamp mount movable relative to the fiber alignment block along at least one axis; and
       a cover removably enclosing at least a portion of the plurality of fiber grooves;
    a fiber clamp, the fiber clamp removably securable to the fiber clamp mount, the fiber clamp comprising:
       a clamp body and at least one groove defined in the clamp body; and
       a connector holder, the connector holder comprising an arm extending from the clamp body and a plurality of connector clips mounted to the arm.

14. The optical fiber mass splice assembly of claim 13, wherein the cover is a magnet.

15. The optical fiber mass splice assembly of claim 13, wherein a longitudinal axis, lateral axis, and transverse axis are defined by the fiber setting fixture, and wherein the plurality of fiber grooves extend at an angle to a plane defined by the longitudinal axis and lateral axis.

16. The optical fiber mass splice assembly of claim 13, wherein the plurality of connector clips are removably mounted to the arm.

17. The optical fiber mass splice assembly of claim 13, wherein the arm is cantilevered from the clamp body and the plurality of connector clips are mounted at a free end of the arm.

* * * * *